US010280034B2

(12) United States Patent
Belani et al.

(10) Patent No.: US 10,280,034 B2
(45) Date of Patent: May 7, 2019

(54) FLOATING COUNTER-BALANCED LEVELWIND CARRIER SYSTEM

(71) Applicant: Makani Technologies LLC, Alameda, CA (US)

(72) Inventors: Abhimanyu Belani, Mountain View, CA (US); Elias Patten, Mountain View, CA (US)

(73) Assignee: Makani Technologies LLC, Alameda, CA (US)

(*) Notice: Subject to any disclaimer, the term of this patent is extended or adjusted under 35 U.S.C. 154(b) by 257 days.

(21) Appl. No.: 15/368,252

(22) Filed: Dec. 2, 2016

(65) Prior Publication Data

US 2018/0155152 A1    Jun. 7, 2018

(51) Int. Cl.
*B65H 57/26* (2006.01)
*B64C 39/02* (2006.01)
(Continued)

(52) U.S. Cl.
CPC .......... *B65H 57/26* (2013.01); *B64C 39/022* (2013.01); *B65H 54/28* (2013.01); *B65H 75/265* (2013.01); *B65H 75/4402* (2013.01); *B65H 75/4407* (2013.01); *B65H 75/4415* (2013.01); *B66D 1/36* (2013.01); *B66D 1/38* (2013.01); *F03D 5/00* (2013.01); *F03D 9/25* (2016.05); *B65H 2701/34* (2013.01); *F03D 13/20* (2016.05);
(Continued)

(58) Field of Classification Search
CPC ...... B65H 57/26; B65H 54/28; B65H 75/265; B65H 75/4402; B65H 75/4407; B65H 75/4415; B65H 2701/34; F03D 9/25; F03D 5/00; F03D 13/20; B64C 39/022; B64C 2201/148; B64C 27/02; Y02P 70/30; Y02E 10/70; Y02E 10/725; F05B 2240/921; F05B 2240/923; B66D 1/60; B66D 1/38; B66D 1/39; B66D 1/36; B66D 2700/0191

See application file for complete search history.

(56) References Cited

U.S. PATENT DOCUMENTS 190,811 A * 5/1877 Bevelander ........ B65H 75/4402
242/397.2
2,453,184 A * 11/1948 Berry ....................... B66D 1/36
242/157.1
(Continued)

FOREIGN PATENT DOCUMENTS

WO          9406678 A1    3/1994
WO     2013096345 A1    6/2013

OTHER PUBLICATIONS

International Searching Authority, International Search Report and Written Opinion dated Feb. 27, 2018, issued in connection with International Patent Application No. PCT/US2017/061630, filed on Nov. 14, 2017, 18 pages.

*Primary Examiner* — Michael E Gallion
(74) *Attorney, Agent, or Firm* — McDonnell Boehnen Hulbert & Berghoff LLP

(57) ABSTRACT

A system for carrying a tether guide, including a counter-balanced support system with two pivot points, where a first pivot allows the tether guide to travel up and down and the second pivot allows the tether guide to match the tether angle. Both pivots may be passive pivots. A shuttle that carries the tether guide may be electronically cammed to follow variable pitch helical grooves of a winch drum as the tether guide traverses across the drum length.

20 Claims, 7 Drawing Sheets

(51) Int. Cl.
  *B66D 1/38*   (2006.01)
  *B66D 1/36*   (2006.01)
  *B65H 54/28*  (2006.01)
  *B65H 75/26*  (2006.01)
  *F03D 5/00*   (2006.01)
  *B65H 75/44*  (2006.01)
  *F03D 9/25*   (2016.01)
  *F03D 13/20*  (2016.01)

(52) U.S. Cl.
  CPC ... *F05B 2240/921* (2013.01); *F05B 2240/923* (2013.01); *Y02E 10/70* (2013.01); *Y02E 10/725* (2013.01); *Y02P 70/30* (2015.11)

(56) References Cited

U.S. PATENT DOCUMENTS

| | | | | |
|---|---|---|---|---|
| 2,473,628 A * | 6/1949 | Allison | | B66D 1/36 242/157.1 |
| 2,662,703 A * | 12/1953 | Brown | | B65H 54/2821 242/397.3 |
| 3,078,060 A * | 2/1963 | Bus, Sr. | | B66D 1/36 24/136 A |
| 3,456,899 A * | 7/1969 | Burch | | B66D 1/39 242/484 |
| 3,552,682 A * | 1/1971 | Walsh | | B63B 21/58 242/397.3 |
| 3,809,334 A * | 5/1974 | Beurer | | B64D 1/22 242/390.2 |
| 4,455,961 A * | 6/1984 | Hansen | | B66D 1/38 114/242 |
| 4,778,121 A * | 10/1988 | Minnee | | B66D 1/38 242/157.1 |
| 4,892,262 A * | 1/1990 | Hurst | | B66D 1/38 242/157.1 |
| 5,330,122 A * | 7/1994 | Wood | | B65H 54/2821 242/397.3 |
| 5,381,988 A * | 1/1995 | Kattas | | A63H 27/04 244/153 A |
| 5,385,314 A * | 1/1995 | Hughes | | B65H 54/2866 242/397.3 |
| 6,435,447 B1 | 8/2002 | Coats et al. | | |
| 6,811,112 B1 * | 11/2004 | Currie | | B65H 54/2872 242/157.1 |
| 7,111,803 B2 * | 9/2006 | Mott | | B66D 1/38 242/397.4 |
| 7,380,742 B2 | 6/2008 | Stevens | | |
| 7,419,137 B2 * | 9/2008 | Boon | | B65H 75/425 242/397.3 |
| 9,248,999 B2 * | 2/2016 | Xydias | | B66D 1/38 |
| 9,475,589 B2 * | 10/2016 | Hachtmann | | B64F 3/00 |
| 2004/0021031 A1 * | 2/2004 | Klaus | | B65H 54/2827 242/483.8 |
| 2004/0069981 A1 * | 4/2004 | Pelletier | | B66D 1/38 254/385 |
| 2005/0017129 A1 * | 1/2005 | McDonnell | | B64C 25/68 244/110 G |
| 2005/0087644 A1 * | 4/2005 | Kim | | B65H 75/425 242/390.8 |
| 2005/0116079 A1 | 6/2005 | Stevens | | |
| 2006/0071116 A1 | 1/2006 | Quenneville et al. | | |
| 2009/0278353 A1 * | 11/2009 | Da Costa Duarte Pardal | | F03D 5/00 290/44 |
| 2010/0026007 A1 * | 2/2010 | Bevirt | | B64C 31/06 290/55 |
| 2010/0051890 A1 * | 3/2010 | Lauder | | B64C 27/10 254/382 |
| 2010/0308174 A1 * | 12/2010 | Calverley | | B64C 27/02 244/155 A |
| 2011/0186687 A1 * | 8/2011 | Elder | | B64C 31/06 244/155 A |
| 2012/0048152 A1 * | 3/2012 | Kim | | B66D 1/39 108/20 |
| 2012/0091259 A1 * | 4/2012 | Morris | | B64C 27/02 244/17.13 |
| 2012/0097783 A1 | 4/2012 | Pack et al. | | |
| 2012/0112008 A1 * | 5/2012 | Holifield | | B64C 27/02 244/155 A |
| 2012/0175576 A1 * | 7/2012 | Xydias | | B66D 1/38 254/336 |
| 2013/0140827 A1 | 6/2013 | Carroll | | |
| 2013/0248790 A1 * | 9/2013 | Cavalier, Jr. | | B63B 21/22 254/393 |
| 2014/0061558 A1 * | 3/2014 | Einhorn | | B66D 1/39 254/331 |
| 2014/0183300 A1 * | 7/2014 | MacCulloch | | B64C 39/024 244/1 TD |
| 2015/0158600 A1 * | 6/2015 | Hachtmann | | B64F 3/00 244/110 E |
| 2015/0191259 A1 * | 7/2015 | Giovannini | | B64F 3/02 701/3 |
| 2016/0002013 A1 * | 1/2016 | Hachtmann | | F03D 13/20 254/266 |
| 2018/0155150 A1 * | 6/2018 | Belani | | B65H 57/26 |

* cited by examiner

FLOATING COUNTER-BALANCED LEVELWIND CARRIER SYSTEM

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers is significant.

An alternative to the costly wind turbine towers that may be used to harness wind energy is the use of an aerial vehicle that is attached to a ground station with an electrically conductive tether. Such an alternative may be referred to as an energy kite or an Airborne Wind Turbine (AWT).

SUMMARY

The present disclosure generally relates to a winch drum levelwind carrier system that may be used to facilitate winding and unwinding of a tether. The present disclosure also relates to winch systems that may be used in an Airborne Wind Turbine (AWT) system grounds station and that winch an aerial vehicle attached to the ground station by an electrically conductive tether. The systems disclosed herein may allow for more reliable, safe, and cost effective tether winding.

In one aspect, a level wind carrier system is provided. The system provides a winch drum that may be rotatably coupled to a drum support and rotatable about a drum axis. The winch drum may include a tether winding surface. A transverse support may be coupled to the drum support. The transverse support may be offset in a radial direction from the tether winding surface and may be substantially parallel to the central drum axis. A shuttle may be moveably coupled to the transverse support. A drive system may be configured to move the shuttle along the transverse support and substantially parallel to the drum axis along. A pivot arm may be coupled to the shuttle via a first pivot joint at a proximate end of the pivot arm. The pivot arm may be rotatable about a first pivot axis of the first pivot joint and the first pivot axis may be substantially parallel to the central drum axis. A tether guide may include a planar tether contact portion that may be coupled to a distal end of the pivot arm via a second pivot joint. The second pivot joint may be rotatable about a second pivot axis that is substantially parallel to the first pivot axis. The planar tether contact portion may be configured to contact a tether and substantially match an elevation angle of the tether.

In another aspect, a level wind carrier system is provided. The system provides a winch drum that may be rotatably coupled to a drum support and rotatable about a drum axis. The winch drum may include a tether winding surface. A transverse support may be coupled to the drum support. The transverse support may be offset in a radial direction from the tether winding surface and may be substantially parallel to the central drum axis. A shuttle may be movably coupled to the transverse support. A drive system may be configured to move the shuttle along the transverse support and substantially parallel to the drum axis along. A pivot arm may be coupled to the shuttle via a first pivot joint at a proximate end of the pivot arm. The pivot arm may be rotatable about a first pivot axis of the first pivot joint and the first pivot axis may be substantially parallel to the central drum axis. A tether guide may be coupled to a distal end of the pivot arm via a second pivot joint. The second pivot joint may be rotatable about a second pivot axis that is substantially parallel to the first pivot axis. The tether guide may be configured to contact a tether and substantially match an elevation angle of the tether. A counterweight may be coupled to the pivot arm. The counter-weight may be positioned to counterbalance at least a portion of the combined weight of the tether guide and pivot arm about the first pivot axis.

In another aspect, an aerial wind turbine system is provided. The system provides an aerial vehicle and an electrically conductive tether couple to the aerial vehicle at a distal end. The system further provides a winch drum rotatable about a drum axis. The drum may include a tether winding surface adapted to receive at least a portion of the tether during rotation of the winch drum. A winch drum support may be coupled to the winch drum. A transverse support may be coupled to the drum support. The transverse support may be offset in a radial direction from the tether winding surface and may be substantially parallel to the central drum axis. A shuttle may be slidably coupled to the transverse support via one or more linear rails. A drive system may include a drive motor coupled to a ball screw and nut, where the ball screw nut may be fixedly coupled to the shuttle. Actuating the drive motor may rotate the ball screw and move the shuttle substantially parallel to the drum axis along the transverse support. A pivot arm may be coupled to the shuttle via a first pivot joint at a proximate end of the pivot arm and rotatable about a first pivot axis. The first pivot axis may be substantially parallel to the central drum axis. A tether guide may include a planar tether contact portion, where a top surface of the planar tether contact portion may be coupled to a distal end of the pivot arm via a second pivot joint rotatable about a second pivot axis that may be substantially parallel to the first pivot axis. The planar tether contact portion may be configured to contact a tether and substantially match an elevation angle of the tether.

These as well as other aspects, advantages, and alternatives, will become apparent to those of ordinary skill in the art by reading the following detailed description, with reference where appropriate to the accompanying drawings.

DETAILED DESCRIPTION

Figure 1:
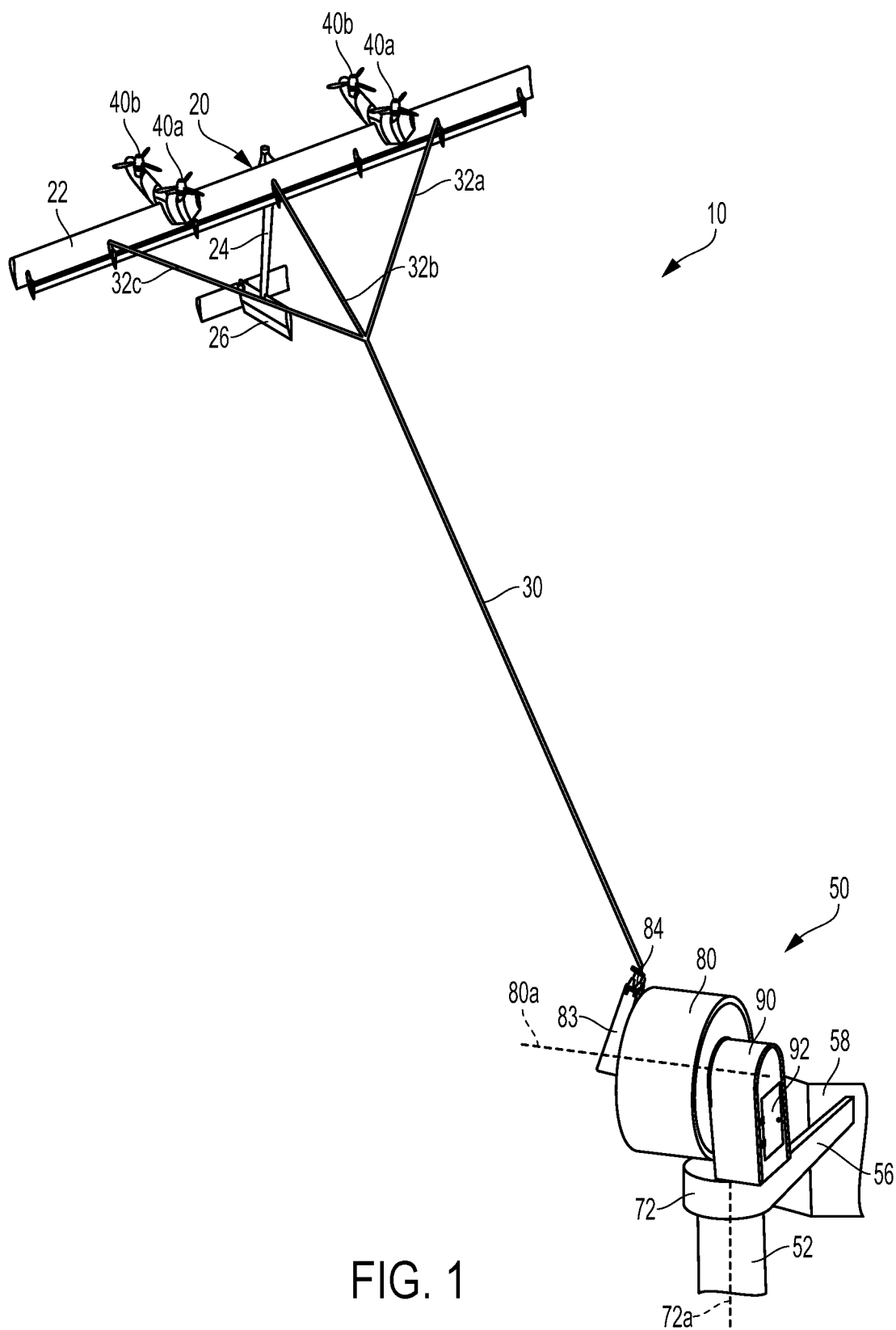
FIG. 1 is a perspective view of an example embodiment of an airborne wind turbine in a flight mode, including an aerial vehicle attached to a ground station by a tether.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed methods and systems can be arranged and combined in a wide variety of different configurations, all of which are contemplated herein.

Furthermore, all of the Figures described herein are representative only and the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. Overview

Wind energy systems, such as an Airborne Wind Turbine (AWT), may be used to convert wind energy to electrical energy. An AWT is a wind based energy generation device that may include an aerial vehicle that is attached to a ground station by an electrically conductive tether. The aerial vehicle may be constructed of a rigid wing with a plurality of mounted turbines. The aerial vehicle may be operable to fly in a path across the wind, such as a substantially circular path above the ground (or water) to convert kinetic wind energy to electrical energy. In such crosswind flight, the aerial vehicle may fly across the wind in a circular pattern similar to the tip of a wind turbine blade. The turbines attached to the rigid wing may be used to generate power by slowing the wing down. In particular, air moving across the turbine blades may force the blades to rotate, driving a generator to produce electricity. The aerial vehicle may also be connected to a ground station via an electrically conductive tether that transmits power generated by the aerial vehicle to the ground station, and onto a grid.

The electrically conductive tether may be configured to withstand one or more forces of the aerial vehicle when the aerial vehicle is in flight mode (e.g., takeoff, landing, hover flight, forward flight, and/or crosswind flight). As such, the tether may include a core constructed of high strength fibers. In addition to transmitting electrical energy generated by the aerial vehicle to the ground station, as noted above, the tether may also be used to transmit electricity from the ground station to the aerial vehicle in order to power the aerial vehicle during operation. Accordingly, the tether may also include one or more electrical conductors for the transmission of electrical energy generated by the aerial vehicle and/or transmission of electricity to the aerial vehicle. In some embodiments, the tether may include a plurality of insulated electrical conductors that surround the tether core. In some embodiments, the tether may also include one or more optical conductors for the transmission of data to and from the aerial vehicle.

When it is desired to land the aerial vehicle, the electrically conductive tether may be wound onto a spool or winch drum on the ground station and the aerial vehicle may be reeled in towards a perch on the ground station. Prior to landing on the perch, the aerial vehicle may transition from a flying mode to a hover mode. The drum may be further rotated to further wind the tether onto the drum until the aerial vehicle comes to rest on the perch.

The winch drum may have a tether winding surface that consists of one more helical channels into which the tether lays when wound onto the drum. The channels may constrain the tether in one or more dimensions in order to guide the tether into a particular winding pattern and/or to prevent the tether from moving laterally during winding or unwinding. A levelwind system may assist in guiding the tether into grooves or onto a particular location of the winch drum. The levelwind may constrain a portion of the tether during winding or unwinding and apply a bias force to keep the tether pressed onto the winch drum and/or located laterally along the length of the winch drum.

II. Illustrative Airborne Wind Turbines

Figure 2:
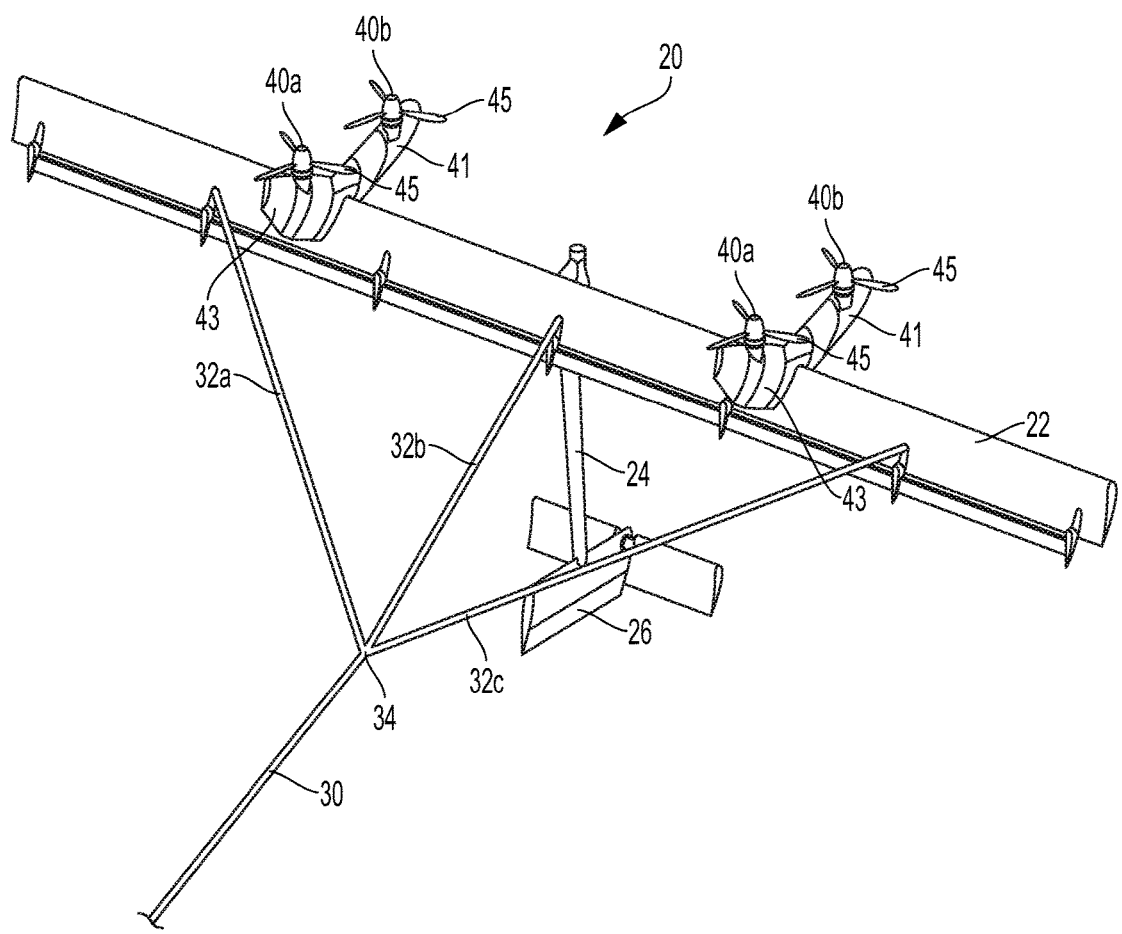
FIG. 2 is a close-up perspective view of the aerial vehicle shown in FIG. 1.

As illustrated in FIGS. 1-2, an example embodiment of an Airborne Wind Turbine (AWT) 10 is disclosed. AWT 10 is a wind based energy generation device that includes an aerial vehicle 20 constructed of a rigid wing 22 with mounted motor/generators (including rotors) 40a and 40b that flies in a path, such as a substantially circular path, across the wind. In an example embodiment, the aerial vehicle 20 may fly between 250 and 600 meters above the ground (or water) to convert kinetic wind energy to electrical energy. However, an aerial vehicle 20 may fly at other heights without departing from the scope of the invention. In crosswind flight, the aerial vehicle 20 flies across the wind in a circular pattern similar to the tip of a wind turbine. The motor/generators 40a and 40b attached to the rigid wing 22 are used to generate power. Drag forces from air moving across the rotor blades 45 forces them to rotate, driving the motor/generator to produce electricity. The aerial vehicle 20 is connected to a ground station 50 via an electrically conductive tether 30 that transmits power generated by the aerial vehicle 20 to the ground station 50, and potentially on to a power grid.

As shown in FIG. 1, the aerial vehicle 20 may be connected to the tether 30, and the tether 30 may be connected to the ground station 50. In this example, the tether 30 may be attached to the ground station 50 at one location on the ground station 50. The tether 30 may be attached to the aerial vehicle 20 at three locations on the aerial vehicle 20 using bridal 32a, 32b, and 32c. However, in other examples, the tether 30 may be attached at a single location or multiple locations to any part of the ground station 50 and/or the aerial vehicle 20.

The ground station 50 may be configured to hold and/or support the aerial vehicle 20 until it is in an operational flight mode. The ground station may include a tower 52 that may be on the order of 15 meters tall. The ground station may include a platform 72 that is rotatable relative to the tower 52. The ground station may include a drum support 90.

The ground station may include a winch drum 80 rotatable about drum central axis 80a that is used to reel in aerial vehicle 20 by winding the tether 30 onto the rotatable drum 80. In this example, the drum 80 is coupled to drum support 90 and oriented vertically, although the drum may also be oriented horizontally (or at an angle) in some embodiments. Drum 80 may be rotatable relative to drum support 90. For example, a slewing bearing may couple drum 80 and drum support 90. The slewing bearing may be rotated by one or more motors about an axis of rotation, such as the drum central axis 80a. A gimbal mount 83 may be coupled to winch drum 80 to mount a gimbal 84. For example, gimbal 84 may be configured to rotate about one or more axes and be coupled to, and/or constrain a portion of, the tether 30.

Further, the ground station 50 may be configured to receive the aerial vehicle 20 during a landing. For example, at least one support member 56 may extend from platform 72 and support at least one perch panel 58. FIG. 1 illustrates one or more support members 56 supporting a single perch panel 58, and other variations are possible. Support member(s) 56 may be fixedly attached to platform 72 so that support member(s) 56 and perch panel(s) 58 rotate with platform 72. When the tether 30 is wound onto drum 80, and the aerial vehicle 20 is reeled in towards the ground station 50, the aerial vehicle 20 may come to rest upon perch panel 58.

The ground station 50 may be formed of any material that can suitably keep the aerial vehicle 20 attached and/or anchored to the ground while in hover flight, forward flight, or crosswind flight. In some implementations, ground station 50 may be configured for use on land. However, ground station 50 may also be implemented on a body of water, such as a lake, river, sea, or ocean. For example, a ground station could include or be arranged on a floating off-shore platform, a boat, or fixed to a sea floor, among other possibilities. Further, ground station 50 may be configured to remain stationary or to move relative to the ground or the surface of a body of water.

The tether 30 may transmit electrical energy generated by the aerial vehicle 20 to the ground station 50. In addition, the tether 30 may transmit electricity to the aerial vehicle 20 in order to power the aerial vehicle 20 during takeoff, landing, hover flight, and/or forward flight. Further, the tether 30 may transmit data between the aerial vehicle 20 and ground station 50. The tether 30 may be constructed in various forms and using various materials that may allow for the transmission, delivery, and/or harnessing of electrical energy generated by the aerial vehicle 20 and/or transmission of electricity to the aerial vehicle 20. For example, the tether 30 may include one or more electrical conductors. The tether 30 may also be constructed of a material that allows for the transmission of data to and from the aerial vehicle 20. For example, the tether may also include one or more optical conductors.

The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed from various types of high strength fibers and/or a carbon fiber rod. In some embodiments, the tether has a fixed length of 500 meters.

In one embodiment of the tether, the tether 30 may include a central high-strength core surrounded by a plurality of electrical conductors. The core may comprise a single strand or multiple helically wound strands. Electrical conductors may be provided around the core. An outer sheath may also be provided. In some embodiments, one or more of the electrical conductors may be replaced with one or more optical conductors.

The aerial vehicle 20 may include or take the form of various types of devices, such as a kite, a helicopter, a wing and/or an airplane, an inflatable structure, or other possibilities. The aerial vehicle 20 may be formed of solid structures of metal, plastic and/or other polymers. The aerial vehicle 20 may be formed of various materials that allow for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

As shown in FIG. 1, and in greater detail in FIG. 2, the aerial vehicle 20 may include a main wing 22, motor/generators 40a and 40b, tail boom or fuselage 24, and tail wing 26. Any of these components may be shaped in any form that allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20, reduce drag, and/or increase drag on the aerial vehicle 20 during hover flight, forward flight, and/or crosswind flight. The main wing 22 may be composed of suitable materials for the aerial vehicle 20 to engage in hover flight, forward flight, and/or crosswind flight. For example, the main wing 20 may include carbon fiber and/or e-glass.

Pylons 43 may be used to connect the lower motor/generators 40a to the main wing 22, and pylons 41 may be used to connect the upper motor/generators 40b to the main wing 22. In this example, the pylons 43 and 41 are arranged such that the lower motor/generators 40a are positioned below the wing 22 and the upper motor/generators 40b are positioned above the wing 22. In another example, illustrated in FIGS. 3-4, pylons 41 and 43 may form a single pylon that may be attached to the underside of the main wing 122. In such an embodiment, pylons 43 and 41 may still be arranged such that the lower motor/generators 40a are positioned below the wing 122 and the upper motor/generators 40b are positioned above the wing 22.

The motor/generators 40a and 40b may be configured to generate electrical energy. In this example, the motor/generators (including rotors) 40a and 40b may each include one or more blades 45, such as three blades. The one or more rotor blades 45 may rotate via interactions with the wind and the rotational energy may be used to generate electricity. In addition, the motor/generators 40a and 40b may also be configured to provide a thrust to the aerial vehicle 20 during flight. With this arrangement, the motor/generators 40a and 40b may function as one or more propulsion units, such as a propeller. Although the motor/generators 40a and 40b are depicted as four motor/generators in this example, in other examples the aerial vehicle 20 may include any number of motor/generators.

Referring back to FIG. 1, when it is desired to land the aerial vehicle 20, the winch drum 80 is rotated, causing the electrically conductive tether 30 is wind onto drum 80 and reel in the aerial vehicle 20 towards the perch panels 58 on the ground station 50, and. Prior to landing on the perch panels 58, the aerial vehicle 20 transitions from a flying mode to a hover mode. The drum 80 is further rotated to further wind the tether 30 onto the drum 80 until the aerial vehicle 20 comes to rest on the perch panels 58.

Figure 3:
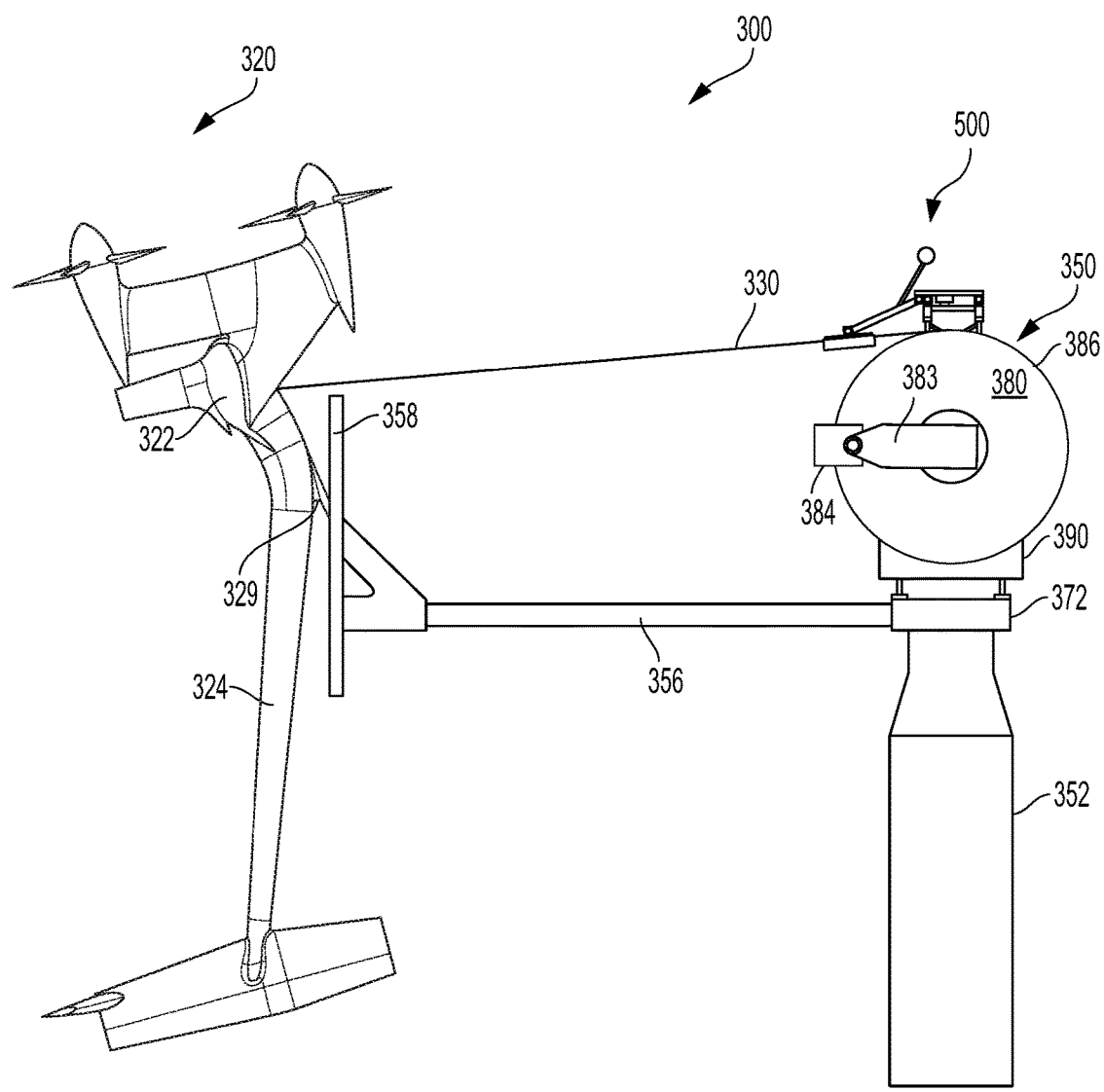
FIG. 3 is a side view of an example embodiment of an airborne wind turbine in a non-flying perched mode, including an aerial vehicle attached to a ground station by a tether, where the aerial vehicle is perched on a perch panel of the ground station.
Figure 4:
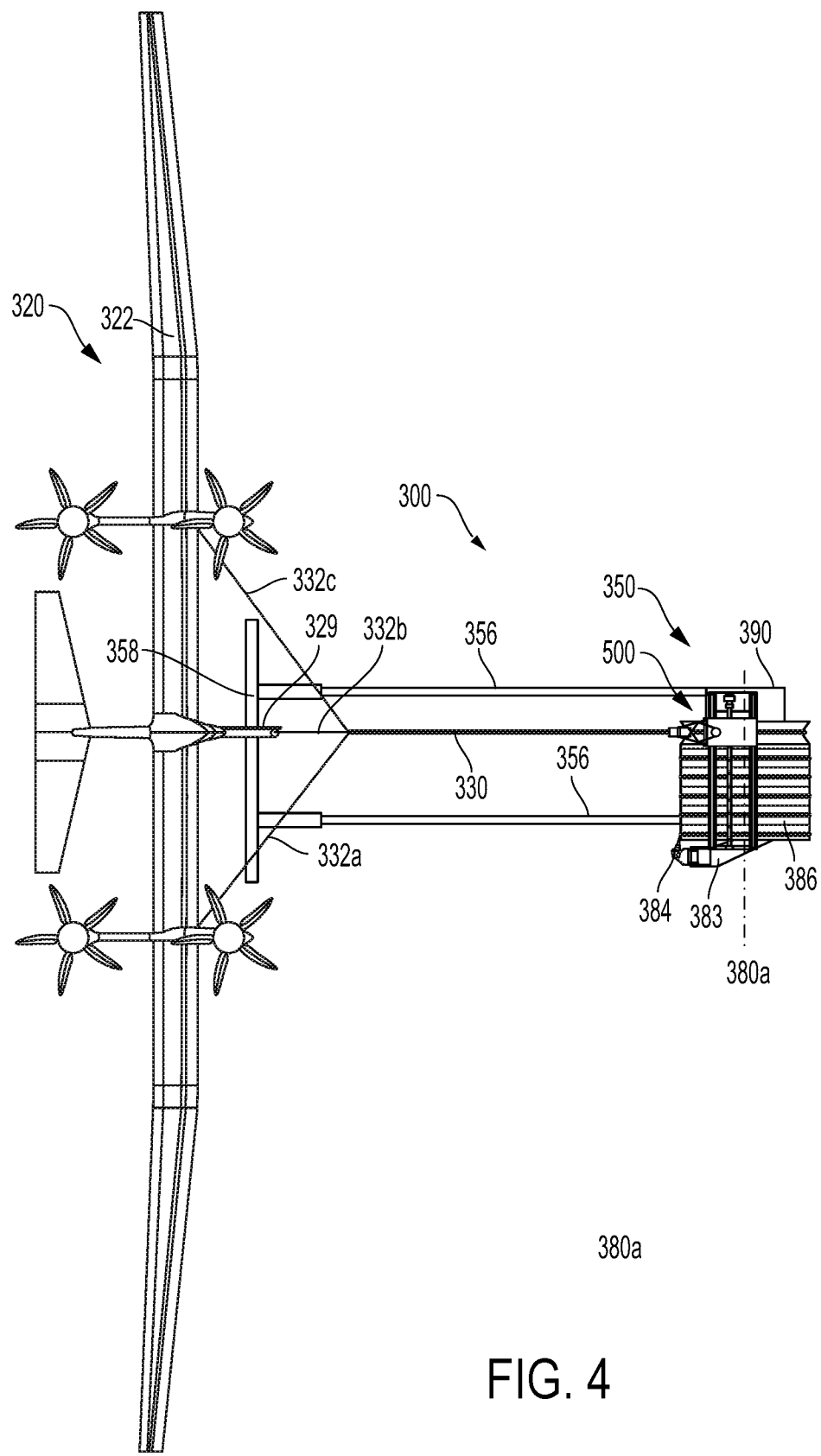
FIG. 4 is a top view of an airborne wind turbine.

FIG. 3 is a side view of an airborne wind turbine 300, according to an example embodiment. As shown, airborne wind turbine 300 includes aerial vehicle 320 perched on perch panel 358 of ground station 350. FIG. 4 is a top view of the aerial vehicle 320 and ground station 350 shown in FIG. 3, according to an example embodiment. In FIGS. 3 and 4, ground station 350 includes a tower 352 upon which platform 372, drum support 390, rotatable winch drum 380, gimbal mount 383, and gimbal 384 are positioned. In some embodiments, the tower 352 may be 15 meters in height. In this perched mode, electrically conductive tether 330 is wrapped around drum 380 and extends from the drum 380 to the wing 322 of aerial vehicle 320 (including bridle lines 332a, 332b, and 332c). A levelwind system 500 may also be used to help position the tether along the exterior winding surface 386 of the drum.

In some embodiments, a portion of the exterior winding surface 386 of the drum 380 may be a continuous helical groove and optionally a variable pitch for the majority of the exterior winding surface 386 to accommodate wrapping the tether 130 in an accumulating pattern within the continuous groove. In one embodiment, the pitch of the grooves may be approximately 38 millimeters and the width of the groove is approximately 27 millimeters.

When the ground station 350 deploys (or launches) the aerial vehicle 320 for power generation via crosswind flight, the tether 330 may be unwound from the drum 380. In one example, one or more components of the ground station 350 may be configured to pay out the tether 330 until the tether 330 is completely unwound from the drum 380 and the aerial vehicle is in crosswind flight. The perch platform 372 may rotate about the top of the tower 352 so that the perch panel 358 is in proper position when the aerial vehicle is 320 is landing.

As shown in FIG. 4, the perch panel 358 may be aligned with the tether 330 being guided through levelwind system 500 and onto a rotatable drum 380 that rotates about an axis 380a. In this manner, the perch panel 358 faces the fuselage 324 of the aerial vehicle 320 when it is landing. The horizontal drum 380 shown in FIGS. 3 and 4 has a central axis of rotation 380a. However a vertical drum or an angled drum could also be used. For example, if a drum rotatable about a vertical axis is used, the perch panel support members 356 could be coupled to the drum such that the perch panel support members 356 extend perpendicularly from the axis of the drum and the tether 330 is wound onto the drum over the perch panel 358. In this manner as the tether 330 is wound onto the drum, the perch panel 358 will always face the aerial vehicle 320 and be in position to receive the peg 329 on the fuselage 324 of the aerial vehicle 320.

III. Illustrative System for a Levelwind Carrier System

Figure 5:
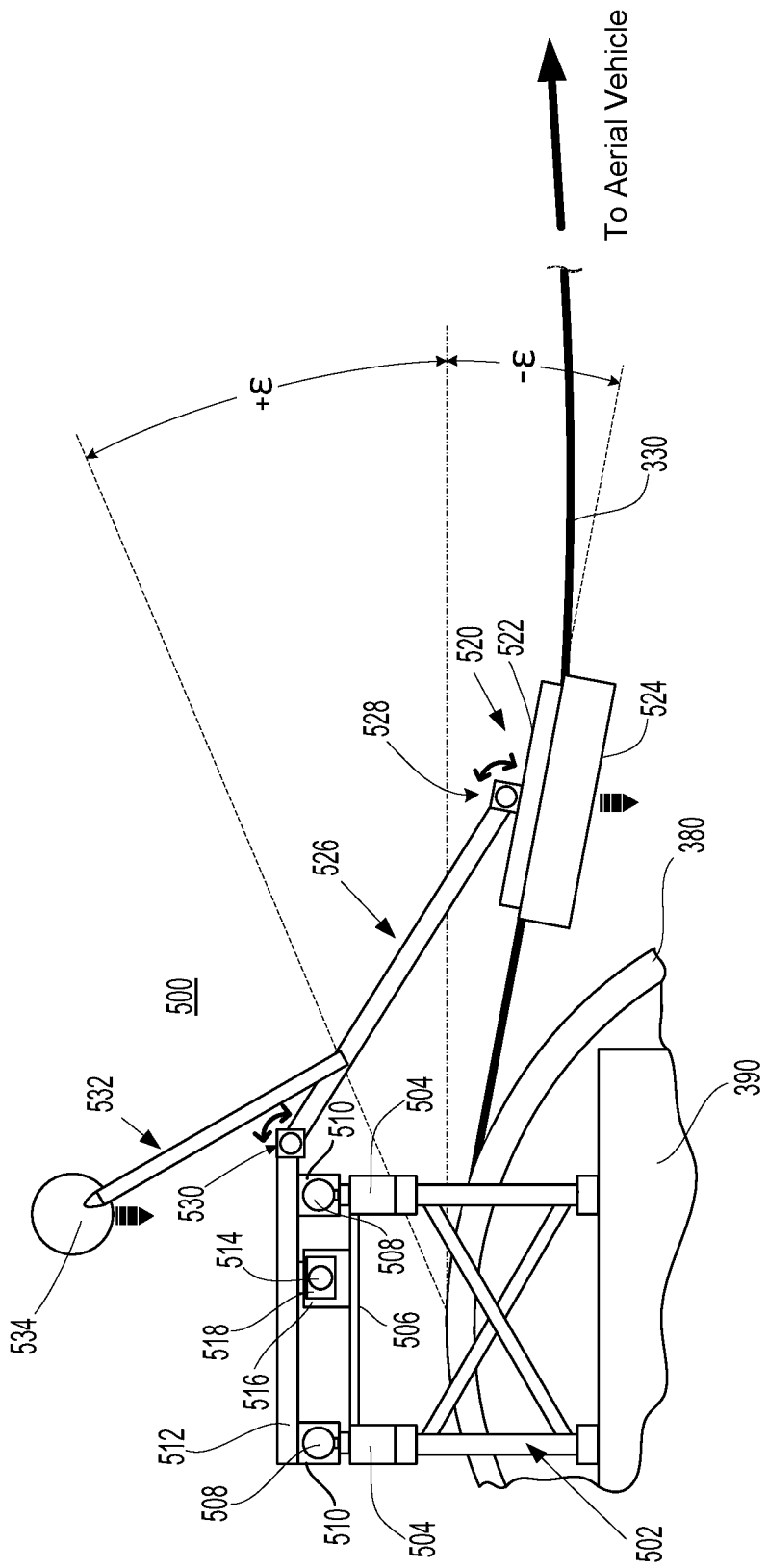
FIG. 5 is a side view of a portion of an airborne wind turbine employing an example embodiment of a winching system.

FIG. 5 illustrates a side view of a portion of an airborne wind turbine employing an example embodiment of a winching system, including a levelwind carrier system 500. For clarity within FIG. 5, only a portion of previously described winch drum 380 and drum support 390 are shown.

In this example embodiment, the levelwind carrier system 500 is offset primarily above the drum 380, where the drum is illustrated as a horizontal drum. In other embodiments, such as when the drum is vertical, the levelwind carrier system may be turned 90 degrees, may maintain the same relative positions, and may be offset primarily to the side of the drum. To the extent that relative directional terms such as horizontal, vertical, above, below, up, and down are used herein, those terms are used for ease of reference only and should be understood to refer to relative directions with a horizontal drum as a reference model. However, this disclosure and the claims are not limited to a horizontal drum. A vertical drum or other orientation drum are explicitly considered. Any relative directional terms should be understood to be in reference to the orientation of the drum. For example, with a horizontal drum, "down" refers generally to a relative direction towards the Earth when describing aspects of the levelwind carrier system; however, with a vertical drum, the drum and the levelwind carrier system would be turned 90 degrees and the term "down" would refer to a direction also turned 90 degrees.

The levelwind carrier system may be coupled to the drum support 390 via a carrier mount 502. A transverse support may include one or more gantry supports 504 and one or more rail guideways 508. The transverse support also may include one more structural plates 506, which may serve to locate and/or structurally reinforce the gantry supports 504, rail guideways 508, and/or serve as a mounting point for such things as a ball screw motor 516. The ball screw motor 516 may drive a ball screw 514 and one or more encoders 518 may record rotation of the ball screw 514 to determine position of a shuttle 512.

The shuttle 512 may be coupled to the transverse support. In the embodiment illustrated in FIG. 5, one or more blocks 510 coupled to the shuttle 512 may slide along one or more rails 508. The shuttle 512 may be coupled to a ball screw nut (not shown) that may be coupled to the ball screw 514, such that rotation of the ball screw 514 will move the shuttle 512 along a length of the drum. The shuttle 512 may serve to move the tether guide 520 and related componentry along the length of the drum during winding and unwinding of the tether 330. Components other than the illustrated rails 508 and blocks 510 may be substituted in the transverse support and still allow the shuttle to be moveably coupled to the transverse support. For example, dovetails or square rails and corresponding blocks may be used to moveably couple the shuttle to the transverse support. As other examples, a t-slot system or roller system may alternatively be utilized. Similarly, drive systems other than the example drive system including the motor 516, ball screw 514, and ball screw nut may be used to move the shuttle along the transverse support. For example, a drive system may include a hydraulic motor and one or more hydraulic pistons, or a drive system may utilize pneumatic pistons. As another example, a linear motor and rail system may be used to couple and/or drive the shuttle. Additionally, a drive system may include other components such as transmissions or gear reducers, couplers, etc.

A pivot arm 526 may couple the tether guide 520 to the shuttle via a pivot joint 530 at the proximate end of the pivot arm 526 and a pivot joint 528 at the distal end of the pivot arm 526. As used herein, a "pivot joint" may refer to one or more rotatable joints and corresponding mounts that share common axis of rotation. Pivot joint 530 and pivot joint 528 may each rotate about axes that are substantially parallel to the drum axis 380a and parallel to each other. Tether guide 520 may include a planar tether contact portion 522 that contacts the tether 330. Planar tether contact portion 522 refers to a substantially flat portion of the tether guide 520 and may include additional sections that are not substantially flat. Pivot joint 528 may be attached to the planar tether contact portion 528, and as illustrated in FIG. 5, pivot joint 528 may be attached to surface of the planar contact portion 528, including a top or side surface. The tether guide 520 may further include two or more retention structures 524 disposed on opposing sides of the planar tether contact portion 522. The retention structures may serve to constrain the tether 330 between the retention structures 524 in order to guide the tether 330 in a preferred winding and/or unwinding about the drum 380. Tether guide 520 with planar contact surface 522 is distinguished from a rotating wheel and it is understood that the tether 330 slides through the tether guide 520 as opposed to rotating the tether guide 520 completely about pivot joint 528 due to movement of the tether 330 through or along the tether guide 520. Tether guide 520 is further distinguished from a standard levelwind structure by at least its open bottom that allows it to reversibly engage and disengage a tether and because both its location relative to the drum 380 and its angle can move under influence from the tether 330 via pivot joints 530 and 528.

The tether 330 may be under tension when the aerial vehicle 320 is in flight or perched, and may be oriented within a range of elevation angles from −ε to +ε as it exits the drum 380. By virtue of the parallel rotation axes between pivot joints 528 and 530 and drum axis 380a, the pivot arm may rest upon the tether 330 and the tether 330 may cause the planar tether contact portion 522 to orient at substantially the same elevation angle ε as the tether 330.

When the planar tether contact portion 522 rests on the tether 330, it may exert a bias force against the tether 330, as illustrated by the block arrow in FIG. 5. The bias force may be a result of a weight of the tether guide 520 and/or other connected components. The bias force may serve to keep the planar tether contact portion 522 and tether 330 in contact during movement of the tether 330 during flight and thus allow the retention structures 524 to constrain and guide the tether 330.

In some embodiments, the weight of the tether guide 520 and/or other connected components may result in too large of a bias force acting against the tether 330. To counteract a portion of the bias force, a counterweight 534 may be coupled to the pivot arm 526 via a counterweight support 532. The counterweight 534 may be located beyond the proximate end of the pivot arm as illustrated in FIG. 5. The counterweight 534 may therefore provide a counteracting torque about pivot point 530 and reduce the bias force applied by the planar tether contact portion 522 against the tether 330.

Each of the pivot joints 528 and 530 may have hard stops that limit the rotation of one or more components connected to the pivot joints 528 and 530 in order to prevent damaging contact between components. For example, the connection between pivot arm 526 and tether guide 520 may include hard stops that limit rotation of tether guide 524 about pivot joint 528 to within a certain operational range. For example, in the embodiment shown, to prevent the tether guide 520 from rotating into the pivot arm 526 and damaging it, the operational range may be limited to 90° of total rotation. Similarly, in the embodiment shown, the connection between pivot arm 526 and shuttle 512 may include hard stops that limit rotation of pivot arm 526 about pivot joint 528 to 60° of total rotation in order to prevent the counterweight 534 or other component(s) from rotating into the shuttle 512.

Figure 6:
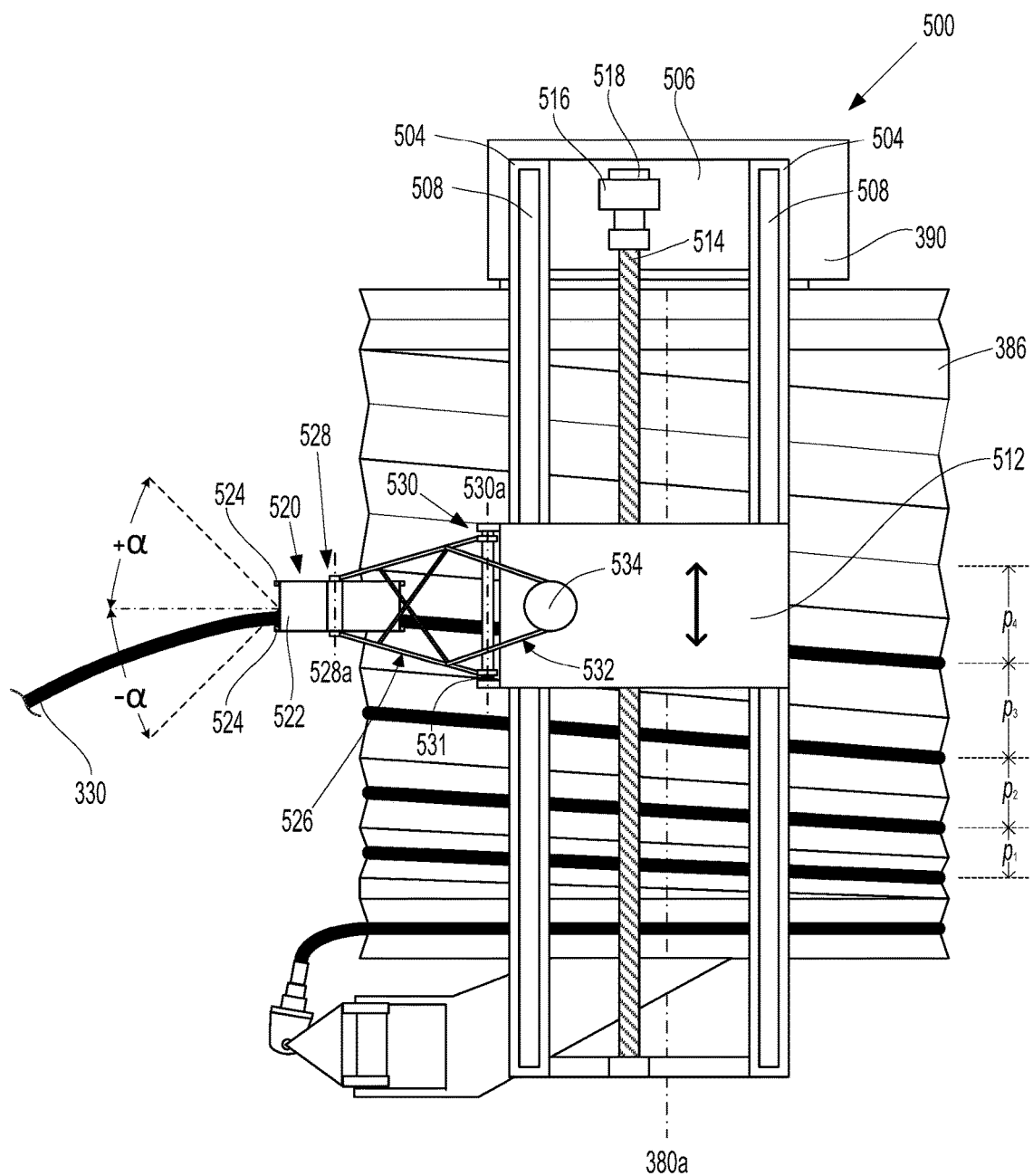
FIG. 6 is a top view of a portion of an airborne wind turbine employing an example embodiment of a winching system.

FIG. 6 illustrates a top view of a portion of an airborne wind turbine employing an example embodiment of a winching system, including a levelwind carrier system 500. For clarity within FIG. 6, only a portion of the airborne wind turbine is shown.

FIG. 6 further illustrates an example arrangement of the rails 508 and shuttle drive system, including the motor 516 and ball screw 514. FIG. 6 also further illustrates the parallel arrangement of pivot joint axes 530a and 528a in relation to drum axis 380a. The pivot joints 528 and 530 allow for vertical movement of the tether guide 520 (in accordance with a coordinate system in which the drum is considered horizontal) and preferably do not allow movement in the horizontal axis along the length of the drum. Accordingly, retaining structures 524 can constrain the tether 330 and guide it onto the tether winding surface 386 of the drum 380 as the drum 380 rotates and the shuttle 512 moves along the transverse support and parallel to the drum axis 380a. The retaining structures 524 can accommodate an off-normal azimuth angle α of the tether 330 and still guide the tether into or out of a particular winding pattern.

The winding surface 386 may include one more helical channels into which the tether 330 lays when wound onto the drum 380. The helical channel(s) may have a constant pitch, or as illustrated in FIG. 6, a variable pitch. As illustrated, the pitch distance increases in subsequent rotations of the drum from $p_1$ through $p_4$, where $p_1$, $p_2$, $p_3$, and $p_4$ represent the distance between the bottoms of subsequent turns of the helical channel. During winding, the drive system may move the shuttle 512 (and accordingly the tether guide 520) along the transverse support at a velocity dependent on the winding speed of the drum 380 and the pitch of the helical channel at the location the tether is currently winding onto the tether winding surface 386, such that the tether 330 lays into the variable pitch helical channel. For example, the drive system may move the shuttle 512 so that the tether guide may guide maintain the tether at a ±1.5 degree fleeting angle to the center of the portion of the helical channel that the tether is currently winding into.

As illustrated, a torsion spring 531 may be located about the pivot joint 530. For embodiments where it is desirable to increase the bias force applied by the planar tether contact surface 522 onto the tether 330—for example, where the drum is oriented in a vertical orientation and the tether guide's weight does not provide a bias force, or where the tether 330 is subject to extreme movement due to fluctuations of the aerial vehicle during flight—a bias spring such as torsion spring 531, may be coupled between the pivot arm 526 and the shuttle 512. The torsion spring 531 may be arranged to provide a force against the pivot arm 526 and in the direction of the drum 380 and tether 330. With this arrangement, the spring 531 may supply at least a portion of the bias force. Alternatively, for embodiments where it is desirable to reduce the bias force applied by the planar tether contact surface 522 onto the tether 330, the torsion spring 531 may be arranged to provide a force against the pivot arm 526 and away from the direction of the drum 380 and tether 330. With this arrangement, the torsion spring 531 may counteract least a portion of the bias force. In other embodiments, different or additional bias springs, such as extension or compression springs for example, may be arranged to increase or counteract the bias force. In some embodiments, the counterweight 534 may be eliminated to increase the bias force, regardless of whether a torsion spring 531 or other bias spring is present.

Figure 7:
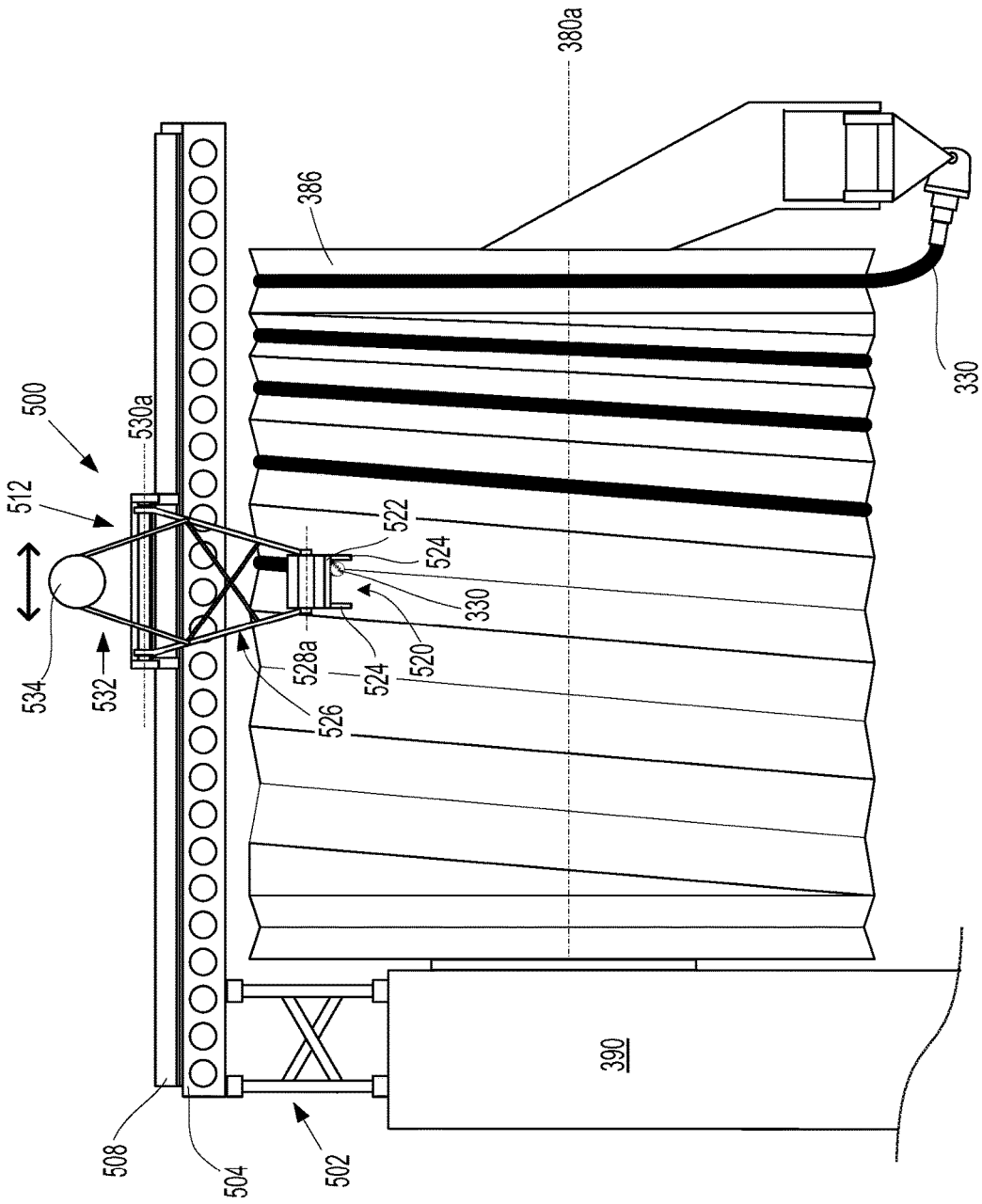
FIG. 7 is a front view of a portion of an airborne wind turbine employing an example embodiment of a winching system.

FIG. 7 illustrates a front view of a portion of an airborne wind turbine employing an example embodiment of a winching system, including a levelwind carrier system 500. For clarity within FIG. 7, only a portion of the airborne wind turbine is shown. FIG. 7 illustrates the transverse support offset in a radial direction from the tether winding surface 386 and substantially parallel to the drum axis 380a. In this embodiment, the transverse support is shown offset above the drum 380. Parallel orientations of axes 530a, 528a, and 380a are also further illustrated. Movement of the shuttle 512 along the transverse support and substantially parallel to the drum axis 380 is illustrated by the double arrows above the shuttle 512. Additionally shown is the planar tether contact portion 522 in contact with the tether 330 while the retaining structures 524 constrain the tether 330 from moving horizontally. The portion of tether 330 extending beyond the tether guide 520 is removed for illustrative clarity.

The example levelwind carrier systems described herein can offer benefits over conventional levelwind systems, including allowing the tether to passively engage and disengage from the tether guide during the beginning of a winding cycle or the end of an unwinding cycle. Additionally, the example levelwind carrier systems described herein can: maintain a minimal fleeting angle while allowing large azimuth angles of the tether; accommodate a wide range of tether elevation angles that account for both flight modes and aerial vehicle perching; prevent small radius curvature of the tether; prevent tether abrasion or contact stress; and, maintain engagement of the tether guide in the case where an aerial vehicle descends below the elevated perch and drops to the ground.

IV. Conclusion

The above detailed description describes various features and functions of the disclosed systems with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system comprising:
    a winch drum rotatably coupled to a drum support and rotatable about a drum axis, the winch drum comprising a tether winding surface;
    a transverse support coupled to the drum support, wherein the transverse support is offset in a radial direction from the tether winding surface and parallel to the central drum axis;
    a shuttle movably coupled to the transverse support;
    a drive system configured to move the shuttle along the transverse support and parallel to the drum axis;
    a pivot arm coupled to the shuttle via a first pivot joint at a proximate end of the pivot arm and rotatable about a first pivot axis, wherein the first pivot axis is parallel to the central drum axis; and
    a tether guide comprising a planar tether contact portion, wherein the planar tether contact portion is coupled to a distal end of the pivot arm via a second pivot joint rotatable about a second pivot axis, and wherein the planar tether contact portion is configured to contact a tether and substantially match an elevation angle of the tether.

2. The system of claim 1, wherein the planar tether contact portion is configured to apply a bias force against the tether.

3. The system of claim 2 further comprising:
    a counterweight coupled to the pivot arm, wherein the counterweight is configured to counteract a portion of the bias force.

4. The system of claim 3, wherein the counterweight is located beyond the proximate end of the pivot arm and elevated above the first pivot joint.

5. The system of claim 2, wherein at least a portion of the bias force is the weight of the tether guide.

6. The system of claim 2 further comprising:
    a spring coupled between the pivot arm and the shuttle, wherein the spring is configured to supply at least a portion of the bias force.

7. The system of claim 1, wherein the tether guide further comprises at least two retention structures extending downward from the planar tether contact portion and disposed opposite each other, wherein the two retention structures are configured to constrain the tether between the retention structures.

8. The system of claim 1, wherein the drive system comprises at least one ball screw drive.

9. The system of claim 1, wherein the tether winding surface comprises a helical channel configured to constrain the tether during winding of the tether around the tether winding surface, and wherein at least a portion of the helical channel has a variable pitch.

10. The system of claim 9, wherein the drive system is configured to move the shuttle along the transverse support at a velocity dependent on a winding speed of the winch drum and the pitch of the helical channel at the location the tether is winding onto the tether winding surface, such that the tether lays into the variable pitch helical channel.

11. A system comprising:
    a drum support;
    a winch drum rotatably coupled to the drum support and rotatable about a drum axis, the winch drum comprising a tether winding surface;
    a transverse support coupled to the drum support and offset parallel to the central drum axis in a radial direction from the tether winding surface;
    a shuttle movably coupled to the transverse support;
    a drive system configured to move the shuttle parallel to the drum axis along the transverse support;
    a pivot arm coupled to the shuttle via a first pivot joint at a proximate end of the pivot arm and rotatable about a first pivot axis parallel to the central drum axis;
    a tether guide coupled to a distal end of the pivot arm via a second pivot joint rotatable about a second pivot axis parallel to the first pivot axis, wherein the tether guide is configured to contact a tether; and
    a counterweight coupled to the pivot arm and positioned to counterbalance at least a portion of the combined weight of the tether guide and pivot arm about the first pivot axis.

12. A system, comprising:
    an aerial vehicle;
    an electrically conductive tether comprising a distal end coupled to the aerial vehicle;
    a winch drum rotatable about a drum axis and comprising a tether winding surface adapted to receive at least a portion of the tether during rotation of the winch drum;
    a winch drum support coupled to the winch drum;
    a transverse support coupled to the drum support and offset parallel to the central drum axis in a radial direction from the tether winding surface;
    a shuttle slidably coupled to the transverse support via one or more linear rails;
    a drive system comprising a drive motor coupled to a ball screw and nut, wherein the ball screw nut is fixedly coupled to the shuttle, wherein actuating the drive motor rotates the ball screw and moves the shuttle parallel to the drum axis along the transverse support;
    a pivot arm coupled to the shuttle via a first pivot joint at a proximate end of the pivot arm and rotatable about a first pivot axis parallel to the central drum axis; and
    a tether guide comprising a planar tether contact portion, wherein a top surface of the planar tether contact portion is coupled to a distal end of the pivot arm via a second pivot joint rotatable about a second pivot axis that is parallel to the first pivot axis, and wherein the planar tether contact portion is configured to contact a tether and substantially match an elevation angle of the tether.

13. The system of claim 12, wherein the planar tether contact portion is configured to apply a bias force against the tether.

14. The system of claim 13 further comprising a counterweight coupled to the pivot arm, wherein the counterweight is configured to counteract a portion of the bias force.

15. The system of claim 14, wherein the counterweight is located beyond the proximate end of the pivot arm and elevated above first pivot joint.

16. The system of claim 13, wherein at least a portion of the bias force is the weight of the tether guide.

17. The system of claim 13 further comprising a tension spring coupled between the pivot arm and the shuttle and configured to supply at least a portion of the bias force.

18. The system of claim 12, wherein the tether guide further comprises at least two retention structures extending downward from the planar tether contact portion and disposed opposite each other, wherein the two retention structures are configured to constrain the tether between the retention structures.

19. The system of claim 12, wherein the tether winding surface comprises a helical channel configured to constrain the tether during winding of the tether around the tether winding surface, wherein at least a portion of the helical channel has a variable pitch.

20. The system of claim 19, wherein the drive system is configured to move the shuttle along the transverse support at a velocity dependent on a winding speed of the winch drum and the pitch of the helical channel at the location the tether is winding onto the tether winding surface, such that the tether lays into the variable pitch helical channel.

* * * * *